US012543764B2

(12) United States Patent
Triantafyllou

(10) Patent No.: US 12,543,764 B2
(45) Date of Patent: Feb. 10, 2026

(54) LIQUID OAT BASE

(71) Applicant: OATLY AB, Landskrona (SE)

(72) Inventor: Angeliki Triantafyllou, Alimos (GR)

(73) Assignee: Oatly AB, Landskrona (SE)

( * ) Notice: Subject to any disclaimer, the term of this patent is extended or adjusted under 35 U.S.C. 154(b) by 147 days.

(21) Appl. No.: 17/386,167

(22) Filed: Jul. 27, 2021

(65) Prior Publication Data

US 2022/0015399 A1 Jan. 20, 2022

Related U.S. Application Data

(63) Continuation of application No. 15/656,259, filed on Jul. 21, 2017, now abandoned, which is a continuation of application No. 14/759,449, filed as application No. PCT/SE2014/000010 on Jan. 28, 2014, now Pat. No. 9,743,684.

(30) Foreign Application Priority Data

Feb. 5, 2013 (SE) .................................. 1300087-2

(51) Int. Cl.
| | | |
|---|---|---|
| A23L 7/10 | (2016.01) | |
| A23C 11/10 | (2025.01) | |
| A23L 2/38 | (2021.01) | |
| A23L 2/68 | (2006.01) | |
| A23L 7/104 | (2016.01) | |
| A23L 33/00 | (2016.01) | |
| A23L 33/185 | (2016.01) | |

(52) U.S. Cl.
CPC ................ *A23L 7/10* (2016.08); *A23C 11/10* (2013.01); *A23L 2/382* (2013.01); *A23L 2/68* (2013.01); *A23L 7/107* (2016.08); *A23L 33/185* (2016.08); *A23L 33/30* (2016.08); *A23V 2002/00* (2013.01); *A23V 2250/5484* (2013.01)

(58) Field of Classification Search
CPC ... A23L 7/10; A23L 2/382; A23L 2/68; A23L 7/107; A23L 33/185; A23L 33/30; A23L 2/52; A23C 11/10
USPC .......................................................... 426/29
See application file for complete search history.

(56) References Cited

U.S. PATENT DOCUMENTS

| | | |
|---|---|---|
| 3,857,967 A | 12/1974 | Kikuchi et al. |
| 4,996,063 A | 2/1991 | Inglett |
| 5,082,672 A | 1/1992 | Hamada et al. |
| 5,686,123 A | 11/1997 | Lindahl et al. |
| 5,912,031 A | 6/1999 | Fitchett et al. |
| 6,063,983 A | 5/2000 | Georgopoulos |
| 6,451,369 B1 | 9/2002 | Triantafyllou |
| 6,592,914 B1 | 7/2003 | Triantafyllou |
| 7,160,564 B2 | 1/2007 | Triantafyllou et al. |
| 8,337,880 B2 | 12/2012 | Chen et al. |
| 9,743,684 B2 | 8/2017 | Triantafyllou |
| 2002/0081367 A1 | 6/2002 | Triantafyllou |
| 2004/0072318 A1 | 4/2004 | Yamaguchi et al. |
| 2004/0091575 A1 | 5/2004 | Matsumura et al. |
| 2004/0166558 A1* | 8/2004 | Yamaguchi ............... A23J 3/34 435/68.1 |
| 2007/0254065 A1 | 11/2007 | Kodera et al. |
| 2007/0254066 A1 | 11/2007 | Miwa et al. |
| 2009/0123598 A1* | 5/2009 | Amano .................... C12C 5/004 426/11 |
| 2010/0151081 A1 | 6/2010 | Tams et al. |
| 2011/0151055 A1 | 6/2011 | Miwa et al. |
| 2012/0034341 A1* | 2/2012 | Chen ......................... A23L 2/39 426/64 |
| 2012/0288587 A1 | 11/2012 | Cheng et al. |

FOREIGN PATENT DOCUMENTS

| | | | | |
|---|---|---|---|---|
| AU | 5933290 A | * | 1/1991 | |
| CN | 102316753 A | * | 1/2012 | ............. A21D 13/00 |
| EP | 731646 A1 | | 9/1996 | |
| EP | 0912100 A1 | | 5/1999 | |
| EP | 0976829 A2 | | 2/2000 | |
| EP | 1106696 A1 | | 6/2001 | |
| EP | 1124441 A1 | | 8/2001 | |
| EP | 1371734 A1 | | 12/2003 | |
| EP | 1836907 A1 | | 9/2007 | |
| EP | 1839491 A1 | | 10/2007 | |
| EP | 2305047 A1 | | 4/2011 | |
| TW | 201105251 A | | 2/2011 | |
| WO | WO 90/00010 A2 | | 1/1990 | |
| WO | WO 95/07628 | | 3/1995 | |
| WO | WO 97/43910 | | 11/1997 | |
| WO | WO 98/00029 A1 | | 1/1998 | |
| WO | WO 00/22938 | | 4/2000 | |
| WO | WO 00/30457 A1 | | 6/2000 | |

(Continued)

OTHER PUBLICATIONS

Prasad et al. (J Food Sci Technol (Feb. 2015) 52(2):662-675). (Year: 2015).*

Tang et al. (in J Food Sci. vol. 68: No. 2, pp. 471-475, 2003). (Year: 2003).*

Hashizume, R. et al., "Crystal Structures of Protein Glutaminase and Its Pro Forms Converted into Enzyme-Substrate Complex", Journal of Biological Chemistry, vol. 286, No. 44, Nov. 4, 2011, pp. 38691-38702.

(Continued)

*Primary Examiner* — Erik Kashnikow
*Assistant Examiner* — Bhaskar Mukhopadhyay
(74) *Attorney, Agent, or Firm* — Knobbe, Martens, Olson & Bear, LLP

(57) ABSTRACT

A process for preparing a liquid oat base or drink of improved soluble oat protein content from an oats material, in particular an oats material that has got been heat treated in a humid state, comprises solubilizing oat protein in an aqueous solvent by means protein-deamidase. Also disclosed is a corresponding liquid oat base and uses thereof.

23 Claims, No Drawings

(56) References Cited

FOREIGN PATENT DOCUMENTS

| WO | WO 2008/138900 A2 | 11/2008 | |
|---|---|---|---|
| WO | WO 2012/018775 A1 | 2/2012 | |
| WO | WO-2012093355 A1 * | 7/2012 | ............. C08B 30/18 |

OTHER PUBLICATIONS

International Search Report dated Aug. 14, 2014 in International Application No. PCT/SE2014/000010.
Liu, Yongle et al., "Effects of glutaminase deamidation on the structure and solubility of rice glutelin", LWT—Food Science and Technology, Academic Press, United Kingdom, vol. 44, No. 10, May 18, 2011, pp. 2205-2210.
Mirmoghtadaie et al., "Effects of succinylation and deamidation on functional properties of oat protein isolate", Food Chemistry, Elsevier Ltd., NL, vol. 114, No. 1, May 1, 2009, pp. 127-131.
Miwa, N. et al., "Effect of deamidation by protein-glutaminase on physicochemical and functional properties of skim milk", International Dairy Journal, vol. 20, No. 6, Jun. 1, 2010, pp. 393-399.
Yong et al., "Effects of enzymatic deamidation by protein-glutaminase on structure and functional properties of wheat gluten", Journal of Agriculture and Food Chemistry, American Chemical Society, US, vol. 54, No. 16, Aug. 9, 2016, pp. 6034-6040.
Zhong-Qing Jiang et al., "Oat protein solubility and emulsion properties improved by enzymatic deamidation", Journal of Cereal Science, vol. 64, Jul. 1, 2015, pp. 126-132.
First Notice of Review Observations, issued on Dec. 12, 2024, for Chinese Application No. 202211657198.1, 18 pages.
Xiaoling, et al., "Effects of Protein-Glutaminase on the Molecular Structure and Functional Properties of Rice Glutelin", School of Chemical and Biological Engineering, Changsha University of Science and Technology, Changsha 410114, 8 pages.

* cited by examiner

LIQUID OAT BASE

FIELD OF THE INVENTION

The present invention relates to a liquid oat base, in particular a liquid oat base for use as a milk substitute or a food additive, and to a method for its manufacture.

BACKGROUND OF THE INVENTION

Oat drinks ("oat milk") for use as cow milk substitutes (EP 731646 B1; EP 1124441 B1; U.S. Pat. No. 6,451,369 B1) and as a raw material for other non-dairy milk products (U.S. Pat. No. 7,160,564 B2) are known in the art. They are preferred by many customers for various reasons, such as for their content of soluble β-glucan fiber beneficial to health, their lack of potentially allergenic proteins and of lactose, which cannot be digested by the majority of the global population. The soluble protein content of oat milk is about 0.5 to about 1.0% by weight. In the prior art processes for preparing oat milk the starting material, such as eat flour or oat bran or the whole oats from which it is made or an aqueous suspending or mixture of it is heated to a temperature and for a time sufficient to substantially prevent the development of endogenous enzymatic activity, in particular lipase/lipoxygenase activity, but also β-glucanase activity, during the respective process. Known oat drinks may be termed "oat bases" since, in addition to be used as drinks, in particular milk drinks, they can be used as a base for food other products, such as oat yogurt or oat batter, or be used as a food additive.

Due to the low fat content of oat milk (typically 0.5% by weight) fat in form of vegetable oil, such as rapeseed oil, is often added to the product.

In spite of the commercial success of oat drinks available on the market there is room for further improvement, in particular in respect of increasing the protein content of the drinks. Processes for producing oat drinks known in the art do not adequately access the protein in oat raw material.

It is known to increase the content of water soluble protein in oat drinks by the use of proteinase in addition to amylase(s) in the enzymatic degradation of oat raw material. The use of proteinase however results in the formation of low-molecular peptides, which may change the organoleptic properties of the drinks.

EP 976 829 A1 discloses a protein deamidating enzyme and a process for its production. EP 1 371 734 A1 discloses a method of denaturating milk protein by a deamidating enzyme to improve its sensitivity to protease and its emulsifying, foaming and gelling characteristics. EP 1 839 491 discloses a dairy product and a method of its production by contacting milk with a deamidating enzyme to suppress acidic and bitter taste. WO 2008/138900 A2 discloses a method for producing an acidified milk drink by contacting raw or processed milk with a deamidating enzyme.

In addition to/separate from deamidation by a deamidating enzyme glutamyl and asparagyl residues in peptides and proteins have been observed to undergo non-enzymatic deamidation in vitro and in vivo (Robinson N A, *Protein Deamidation*, Proc Nat Acad Sci, 99 (2002)5283-5288=http://www.pnas.org/content/99/8/5283.full and literature cited therein).

OBJECTS OF THE INVENTION

It is an object of the invention to provide an oat drink or base of the aforementioned kind, which has improved protein content.

Another object of the invention is to provide said improvements while maintaining or even improving the organoleptic properties of the drink.

A further object of the invention is to provide a process for producing the improved oat drink or base.

Additional objects of the invention will become evident from the following summary of the invention, a number of examples describing preferred embodiments thereof, and the appended claims.

SUMMARY OF THE INVENTION

According to the present invention is provided an oat base of the aforementioned kind having an improved content of soluble oat protein. "Improved protein content" is a higher protein content than obtainable by methods known in the art from a given oat raw material with the proviso that the improved content is not due to the use of protease (peptidase/proteinase).

The oat base of the invention is provided by degrading an oats material with one or more amylases and protein-deamidase.

According to one preferred aspect of the invention the protein-deamidase is one capable of deamidating high-molecular oat protein, such as oat globulin.

According to a preferred aspect of the invention the protein-deamidase does not comprise substantial protease (peptidase) activity. The protein-deamidase of the invention is preferably free from protease activity. Examples for protein-deamidases useful in the invention are disclosed in EP 976829 B1. A preferred amount of protein-deamidaae is from 0.5-20 U/g oat protein.

According to another preferred aspect of the invention, deamidation is carried out in parallel amidolysis, that is, with starch degradation by amylase(s). "In parallel with amidolysis" is understood as simultaneous with the enzymatic degradation of starch by amylase(s). In the process of the invention deamidation of oat protein may however be continued even after amidolysis has ceased or substantially ceased.

The process of the invention can be stopped at a desired viscosity, such as at a viscosity of from 100 cP to 200 cP or from 50 cP to 100 cP or from 25 cP to 50 cP or from 10 cP to 25 cP (sp2/60 rpm/25±2° C.). The process of the invention is preferably stopped by heating to a temperature at which any enzymatic activity is destroyed within a short time, such as within ten seconds or one minute or five minutes, said temperature being >80° C., preferably greater than 90° C., in particular greater than 100° C., such as about 105° C., at which temperature heating for about 10 seconds is sufficient to destroy any enzymatic activity.

The improved oat base of the invention differs from prior art oat bases (oat drinks) by its increased content of soluble oat protein. In this application "soluble" signifies "water soluble". The improvement in soluble protein content obtainable by the method of the invention is 10 percent by weight and up to 20 percent by weight or more.

Thus, according to the present invention, the content of soluble protein in the oat base is not ore increased by addition of soluble protein to the base or to the raw material from which it is made or during the process by which it is manufactured but by use of an appropriate oat raw material and an appropriate protein solubilization process. It is preferable to use a raw material with a high content of protein preserved in its natural state. "Preserved in its (a) natural state" signifies that the protein in the raw material has not been denaturated or has only been denaturated to a minor extent, such as by 10% by weight or 20% by weight.

Oats used for producing oat drinks is dry- or wet-heated prior to use as starting material for producing oat bases or drinks. The purpose with the heat treatment is twofold. On the one hand, the purpose is to destroy beta-glucanase present and/or to prevent it from being formed during starch hydrolysis so as to preserve water-soluble beta-glucans in their native state. Beta-glucans in their native state are high-molecular beta-glucans, such as of a molecular weight of 50,000 D or more. High molecular beta-glucans are considered to constitute a valuable health-promoting component of oat drinks. Inactivation of beta-glucanase by heat treatment is however only indicated if the oat drink to be manufactures is desired to contain substantial amounts of beta-glucans.

On the other hand and, in a more general manner, the purpose with the traditional heat treatment is to inactivate lipase and lipoxygenase. Inactivation of lipase and lipoxygenase is indicated to prevent the product from turning rancid. According to a preferred aspect of the invention the need of inactivating lipase and lipoxigenase can be avoided by removing the lipids of the raw material, such as by extraction with ethanol or supercritical carbon dioxide. Preferably at least 90% and even at least 95% of the lipids are removed.

While the content of water-soluble protein in untreated oats is about 60% to about 70% weight of total protein, it is only about 30% weight in microwave-treated oats (Skånemöllan, Sweden) and in steam-treated (102° C. for 50 min, then air-dried (110° C.-120° C. min for 50 min) oats.

In the method of the invention this kind of heat treatment, in particular steaming, should be avoided or at least be kept as short as possible and/or carried out at a temperature as low as possible to keep oat protein denaturation low. If avoided, the lipids should be removed from the oats. If heating is the preferred method of preventing the product from turning rancid and from preventing substantial degradation of β-glucan, a compromise between heating temperature and/or length of heating, at the one hand, and completeness of inactivation of β-glucanase and lipase/lipoxygenase, at the other hand is attempted.

A preferred raw material for use in the invention is dehulled or hulless/naked, dry milled oat flour that has not been heat treated, in particular steamed. However, wet milled oat flour that has not been heat treated or dry milled flour of any oats fraction can also be used. Particularly preferred is the use of dry milled non-heat treated oats, non-heat treated oat bran, and non-steamed oats.

According to the invention it has been found that heating of oats in any form at a temperature of up to about 50° C. or even up to about 65° C. for a few hours, such as one or two or even five hours, does not result in substantial denaturation. On the other hand, heating such oats material for a corresponding time period at a temperature 80° C. or more does result in a substantial reduction of soluble protein, in particular if the material is in a humid state. Steaming of oats in any form results in substantial denaturation, such as denaturation of 30% or more and even of 50% of more. Consequently, steamed oats materials, such as, for instance, those disclosed in U.S. Pat. Nos. 6,165,365 A and 7,494,683 B2, are not preferred for use in the present invention.

According to one preferred aspect of the invention the oat base of the invention is prepared by milling groats (dehulled oats) with water to obtain a mash containing from 8 by weight to 13% by weight dry substance, then adding amylase(s) and degrading the oat starch at a temperature of from 50° C. to 75° C. The amylase may be beta- and alpha amylase or a mixture thereof, the amylases being added as a mixture or their mixture in the mash being formed by their simultaneous or sequential addition.

The amylases are added in amount(s) sufficient for significant hydrolysis of starch over a time period of from 0.5 h to 4 hrs, in particular from about 1 h to about 2 hrs, hydrolysis of more than 50% by weight of the starch, in particular of more than 80% by weight or even more than 90% weight being considered significant.

Typically the amylase(s) are added in an amount to provide amylase activity of from 140 to 250 Betamyl-3 units and from 0.5 to 4 Ceralpha units per g of starch, in particular of about 180 Betamyl-3 units and about 1 Ceralpha unit per q of starch.

Also disclosed according to the invention is a liquid oat base prepared by the process of the invention and a liquid oat base comprising oat protein deamidated by protein deamidase. It is preferred for the oat base protein to comprise 10% by weight or 20% by weight or more of protein deamidated by protein deamidase.

According to the invention is furthermore disclosed the use of the liquid oat base of the invention as a food, a food additive or a starting material for production of a food, all intended for human consumption.

DESCRIPTION OF PREFERRED EMBODIMENTS

Material and Methods

Oat kernels: Dehulled, steam treated, wet ground or dry ground.

Oat bran (Frebaco Kvarn A R, Lidköping, Sweden): Prepared from steam treated Swedish oat grain by grinding in a rolling mill. Composition. (% by weight): Protein 18, fat 7, carbohydrate 45, fiber 16%, water 9.5.

Enzymes: Protein-glutaminase "Amano 50", 50 U/g (Amino Inc., Japan). Commercial alpha-amylase and beta-amylase are available from various commercial sources.

Alpha-amylase activity: One Ceralpha unit is defined as the amount of enzyme required to release one micromole of p-nitrophenol from BPNPG7 (non-reducing end blocked p-nitrophenyl maltoheptaoside) in one minute under defined assay conditions: http://secure.megazyme.com/files/BOOKLET/K-BETA3_1010_DATA.pdf Beta-amylase activity: One BNPβ-G3 (p-nitrophenyl-β-D-maltotrioside) unit is defined as the amount of enzyme required to release one micromole of n-nitrophenol from PNPβ-G3 in one minute under defined assay conditions: http://secure.megazyme.com/files/BOOKLET/K-BETA3_1010_DATA.pdf Protein-glutaminase activity: One activity unit (U) is defined as the quantity of enzyme producing one μmol of ammonia per min in the reaction with 10 mM aqueous benzylocarbonyl-L-glutaminylglycine (Cbz-Gln-Gly).

Viscosity: Measured with a Brookfield Visco DV-II+ instrument (http://www.brookfieldengineering.com/products/viscosimeters/laboratory-dv-ii.asp.

EXAMPLE 1

Pilot Scale Process for Producing the Improved Oat Base of the Invention

Dehulled, steam treated oat kernels (675 kg) were wet ground in a colloidal mill at a temperature of 54° C. and directly fed into a stainless steel enzyme treatment tank over a period of about 20 min. Stirring was started at a mash volume of about 100 L. About 7.5 L of art aqueous solution of alpha- and beta-amylase (1 Ceralpha unit per 180 Betamyl-3 units per g of starch) was used. Enzyme activity may vary depending on the commercial source of the enzymes; in this experiment the total weight of amylases was 482 g. The enzyme solution was fed into the tank in parallel with the mash over a period of about 12 min at the end of which about 3000 L of the mash had been fed into the tank. The rest of the mash was fed into the tank over a period of about 8 min to bring the total contents of the tank to about 5600 L. The temperature of the mash was kept constant at 56° C.

Protein-glutaminase (PG) dosing. PG (687.5 g) was dissolved in 1.5 L water at room temperature. The PG solution was added to the mash at a viscosity of 160.5 (sp2/60 rpm/25±2° C.). Stirring was continued for about 120 min at a temperature of about 56° C. to reach a mash viscosity of 35 (sp2/60 rpm/25±2° C.) and a pH of 6.6. Any enzyme activity was then destroyed by heating the product to 95° C. The mash was cooled to room temperature and decanted. Decantation can be omitted if a whole grain product is to be produced.

The thus produced oat base of the invention can be transferred into a formulation tank in which rapeseed oil, vitamins, sodium chloride, di- and tricalcium phosphate, and calcium carbonate is added. The thus obtained enriched oat drink has a viscosity (sp2/60 rpm/25±2° C.) of 17.5 cP and a pH of 6.8. The formulated oat drink or oat milk is transferred to a storage tank from which it is dispensed for UHT treatment and packaging.

Product analysis. Deamidation of product: 7.3% of total releaseable ammonia (by treatment with 2 N sulphuric acid at 100° C. for 4 h). Deamidation of control (non-enzymatic deamidation): 1.6% of total releaseable ammonia (same process in absence of PG). Soluble protein: 78% of total protein (product of the invention) v. 64% of total protein (control).

Instead of dehulled steam treated oat kernels also corresponding naked kernels may be used, for instance, as a starting material.

EXAMPLE 2

Modified and Down-Scaled (1:10$^5$) Process of Example 1

Wet-milled oat slurry is heated to 60° C. under stirring. Alpha- and beta-amylase as well as protein glutaminase (1 U/g of oat protein) are added and reacted with the slurry under stirring at 60° C. for two hours. The slurry is theheated to 95° C. for 5 min. Insoluble matter is removed by pulse centrifugation (pulses of 1100 g) and analyzed.

Product analysis. Deamidation of product: 6.9% of total releaseable ammonia. Deamidation of control (non-enzymatic deamidation): 1.9% of total releaseable ammonia (same process in absence of PG). Soluble protein: 84% of total protein (product of the invention) v. 56% of total protein (control).

EXAMPLE 3

Modified and Down-Scaled Process of Example 1

As Example 2 but with heat treated dry milled and sieved oat kernels, fraction size<0.5 mm mixed with water to a dry weight of 11%.

Product analysis. Deamidation of product: 6.1% of total releaseable ammonia. Deamidation of control (non-enzymatic deamidation): 1.5% of total releaseable ammonia (same process in absence of PG). Soluble protein: 59% of total protein (product of the invention) v. 48% of total protein (control).

EXAMPLE 4

Modified and Down-Scaled Process of Example 1

As Example 2 but with non-heat treated dry milled and sieved oat kernels, fraction size<0.5 mm mixed with water to a dry weight of 11%.

Product analysis. Deamidation of product: 8.9% of total releaseable ammonia. Deamidation of control (non-enzymatic deamidation): 1.5% of total releaseable ammonia (same process in absence of PG). Soluble protein: 81% of total protein (product of the invention) v. 62% of total protein (control).

EXAMPLE 5

Deamidation of Oat Drink at Laboratory and Pilot Plant Scale by Protein-Glutaminase The oat base or drink used in the example was prepared according to the method disclosed in European patent no. 731 646. This oat drink is a commercial product manufactured by Oatly A B, Landskrona, Sweden. In Table 1 important features of a number of products according to the invention are shown. Also shown are corresponding features of deamidation products obtained from dry-milled heat-treated oats. The products were obtained in absence of deamidase (0 U) and in presence of deamidase at two deamidase addition regimes (1 U; 2×0.5 U/g oat protein). From Table 1 it is evident that the content of total protein is substantially increased in the presence of deamidase. It is also evident that, at otherwise identical conditions, a non-heat treated starting material yields a product with higher protein content than a corresponding heat-treated starting material.

It is furthermore evident that that, at otherwise identical conditions, sequential addition of deamidase (2×0.5 U) yields a product of higher protein content than obtained by a single addition of the same amount of amylase (1 U). A higher protein content of the product is paralleled by increased emulsion stability (reduced sedimentation rate) of the product.

TABLE 1

Deamidation of oat drink at laboratory and pilot plant scale

| Oat raw material | Protein-Glutaminase, U/g of Oat Protein | Deamidation (%) | Soluble protein, g/100 g (% of total) | Total protein g/100 g | Droplet size (μm), 1.5% fat | Sedimentation |
|---|---|---|---|---|---|---|
| Laboratory scale | | | | | | |
| Wet-milled | 0 U | 1.9 | 0.71 (57%) | 0.84 | 3.2 | 14% UPH** |
| | 1 U | 6.7 | 0.90 (72%) | 0.92 | 1.7 | 2 white PH* |
| | 2 × 0.5 U*** | 6.9 | 1.06 (87%) | 0.95 | 0.8 | 2 white PH |
| Dry-milled, heat treated | 0 U | 1.5 | 0.59 (46%) | 0.64 | 4.5 | 17% UPH |
| | 1 U | 6.1 | 0.75 (59%) | 0.81 | 3.6 | No sediment |
| | 2 × 0.5 U*** | 8.6 | 0.80 (63%) | 0.80 | 4.0 | No sediment |
| Dry milled, non-heat treated | 0 U | 1.5 | 0.88 (64%) | 0.80 | 2.6 | 38% UPH |
| | 1 U | 8.9 | 1.16 (81%) | 0.92 | 1.2 | 30% UPH |
| | 2 × 0.5 U*** | 9.5 | 1.26 (93%) | 0.94 | 1.2 | 28% UPH |
| Oat bran | 0 U | 1.8 | 0.41 (17%) | 1.25 | 7.1 | 13% UPH |
| | 1 U | 5.9 | 1.05 (42%) | 1.62 | 6.3 | 7% UPH |
| | 2 × 0.5 U*** | 6.1 | 1.09 (44%) | 1.60 | 5.6 | 4% UPH |
| Small pilot scale | | | | | | |
| Wet-milled | 0 U | 2.3 | 0.65 (56%) | 0.82 | 15.8 | 10% UPH |
| | 1 U | 7.9 | 0.70 (67%) | 0.80 | 15.8 | 2 white PH |
| | 2 × 0.5 U*** | 13.0 | 0.83 (72%) | 1.01 | 17.8 | No sediment |
| Large pilot scale | | | | | | |
| Wet-milled | 0 U | 1.6 | 0.70 (64%) | 0.75 | 7.9 | 63% UPH |
| | 2 × 0.5 U*** | 7.3 | 1.00 (78%) | 0.91 | 10.0 | 2 white PH |

*PH = Phase;
**UPH = Upper phase;
***0.5 U added to each of two amylase enzymation steps

The invention claimed is:

1. A process for preparing a liquid oat base or drink with improved soluble oat protein content, the process comprising:
   obtaining a slurry comprising an aqueous solvent and an oat material comprising starch and oat protein;
   treating the slurry with an amylase and a protein glutaminase to obtain an amylase-protein glutaminase-treated material;
   removing insoluble matter from the amylase-protein glutaminase-treated material, and
   collecting a solubilized product,
   thereby preparing the liquid oat base or drink.

2. The process of claim 1, wherein the oat material is a material of which the protein has not been denaturated or has only been denaturated to an extent of up to 10% by weight or up to 20% by weight.

3. The process of claim 2, wherein the oat material is one that has not been steamed.

4. The process of claim 1, wherein the amount of the protein glutaminase is from 0.5 U/g of oat protein to 2 U/g of oat protein.

5. The process of claim 1, wherein the oat material is selected from the group consisting of non-steamed wet milled oats, non-steamed dry milled oats, non-steamed oat bran, non-steamed dehulled, and hulless/naked dry milled oat flour.

6. The process of claim 1, wherein the improvement in content of soluble protein in the presence of the amylase and the protein glutaminase is about 10 percent by weight or more as compared to soluble protein in absence of the amylase, and/or the protein glutaminase.

7. The process of claim 1, wherein starch in the oat material is degraded by the amylase.

8. The process of claim 7, wherein the amylase is α-amylase or a mixture of α-amylase and β-amylase.

9. The process of claim 1, wherein the solubilizing comprises oat protein is solubilized by the protein glutaminase concurrently with starch degradation by the amylase.

10. The process of claim 1, wherein the protein glutaminase is added to the slurry in two or more portions during the process.

11. The process of claim 10, wherein a second portion of the two or more portions is added during a period extending from 30 min to 90 min after addition of a first portion of the two or more portions.

12. The process of claim 11, wherein the first portion is added during a first step of starch hydrolysis by the amylase and the second portion is added during a second step of starch hydrolysis by the amylase.

13. The process of claim 9, wherein the solubilizing is carried out at a temperature of from 40° C. to 65° C.

14. The process of claim 9, wherein the solubilizing is performed from 30 min to 120 min.

15. The process of claim 1, wherein the solubilizing is stopped at a desired viscosity of the solubilized product.

16. The process of claim 1, wherein the solubilizing is stopped by heating or cooling.

17. The process of claim 1, wherein the liquid oat base or drink is enriched with one or more of vegetable oil, sodium chloride, dicalcium phosphate, tricalcium phosphate, calcium carbonate, and vitamin.

18. The process of claim 1, wherein the amount of the protein glutaminase is about 1 U/g of oat protein.

19. The process of claim 1, wherein the improvement in content of soluble protein in the presence of the amylase and the protein glutaminase is about 20 percent by weight as compared to soluble protein in presence of the protein-deamidase glutaminase alone.

20. The process of claim 1, wherein the improvement in content of soluble protein in the presence of the amylase and the protein glutaminase is about 30 percent by weight as compared to soluble protein in presence of the amylase alone.

21. The process of claim 1, wherein the solubilizing is performed by stirring at 60€C for two hours.

22. The process of claim 1, wherein removing insoluble matter from the amylase-protein glutaminase-treated material comprises decantation, centrifugation, sieving, or a combination thereof.

23. The process of claim 7, wherein the improvement in content of soluble protein in the presence of the amylase and the protein glutaminase is about 60 percent by weight as compared to soluble protein in absence of the amylase and the protein glutaminase.

* * * * *